Aug. 26, 1952
S. C. GILTHORPE
2,608,156
INVOICE PRINTING MACHINE
Filed Jan. 24, 1948
5 Sheets-Sheet 2
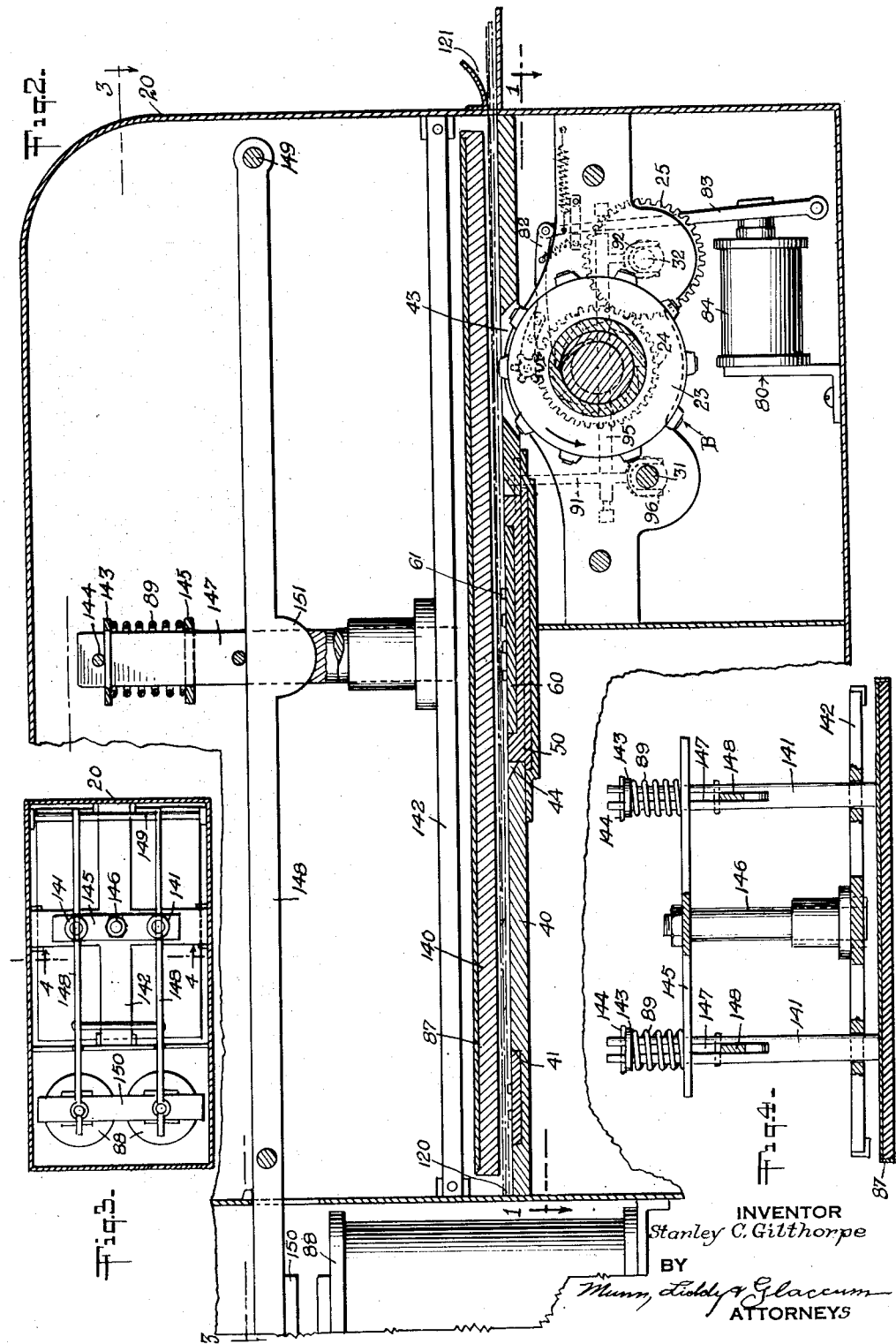
INVENTOR
Stanley C. Gilthorpe
BY
Munn, Liddy & Glaccum
ATTORNEYS

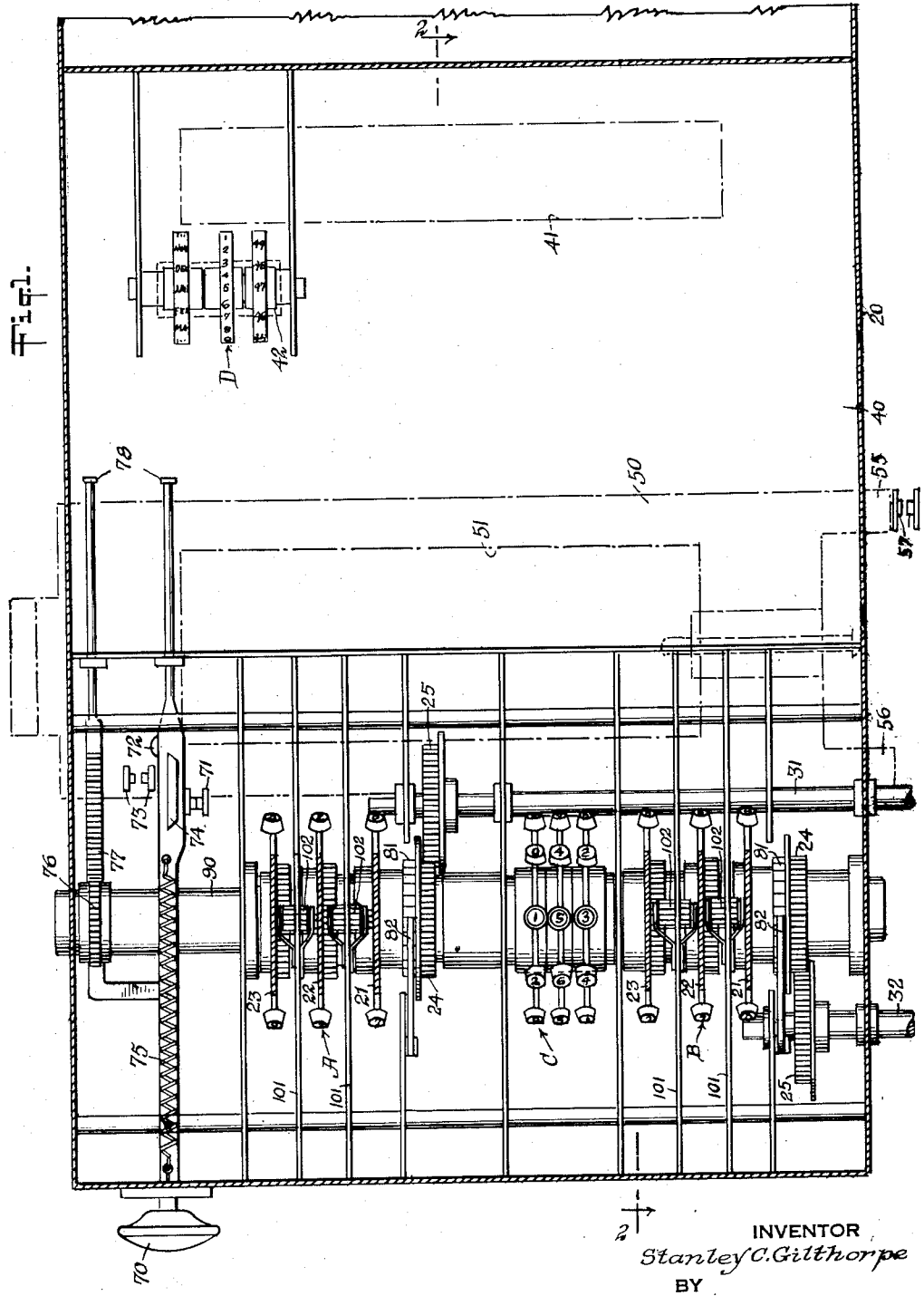

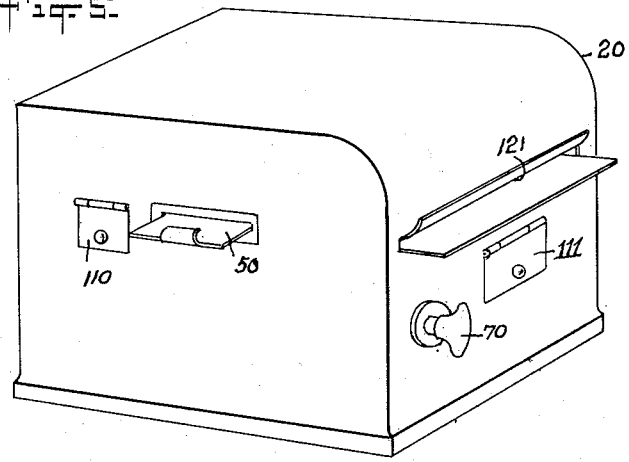
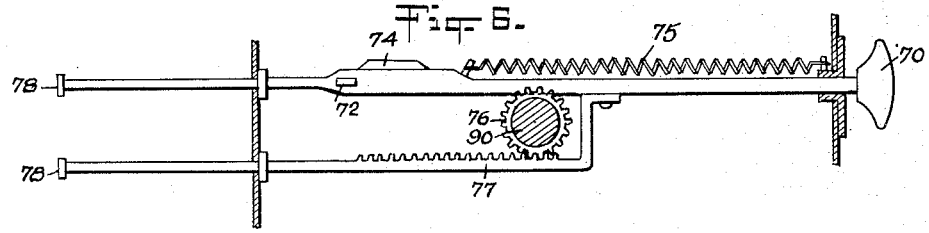
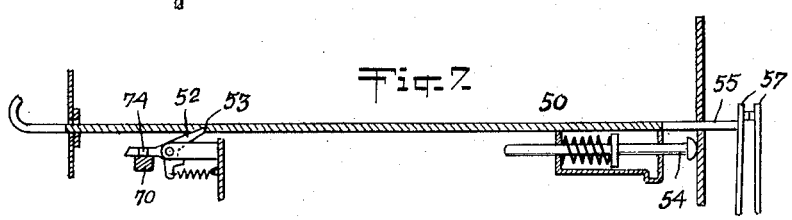
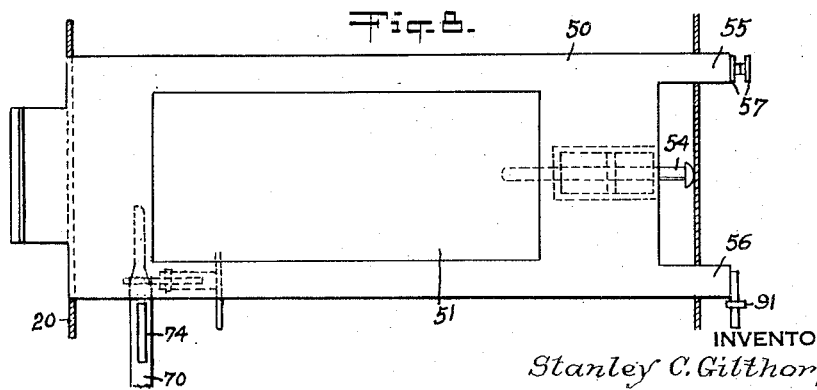

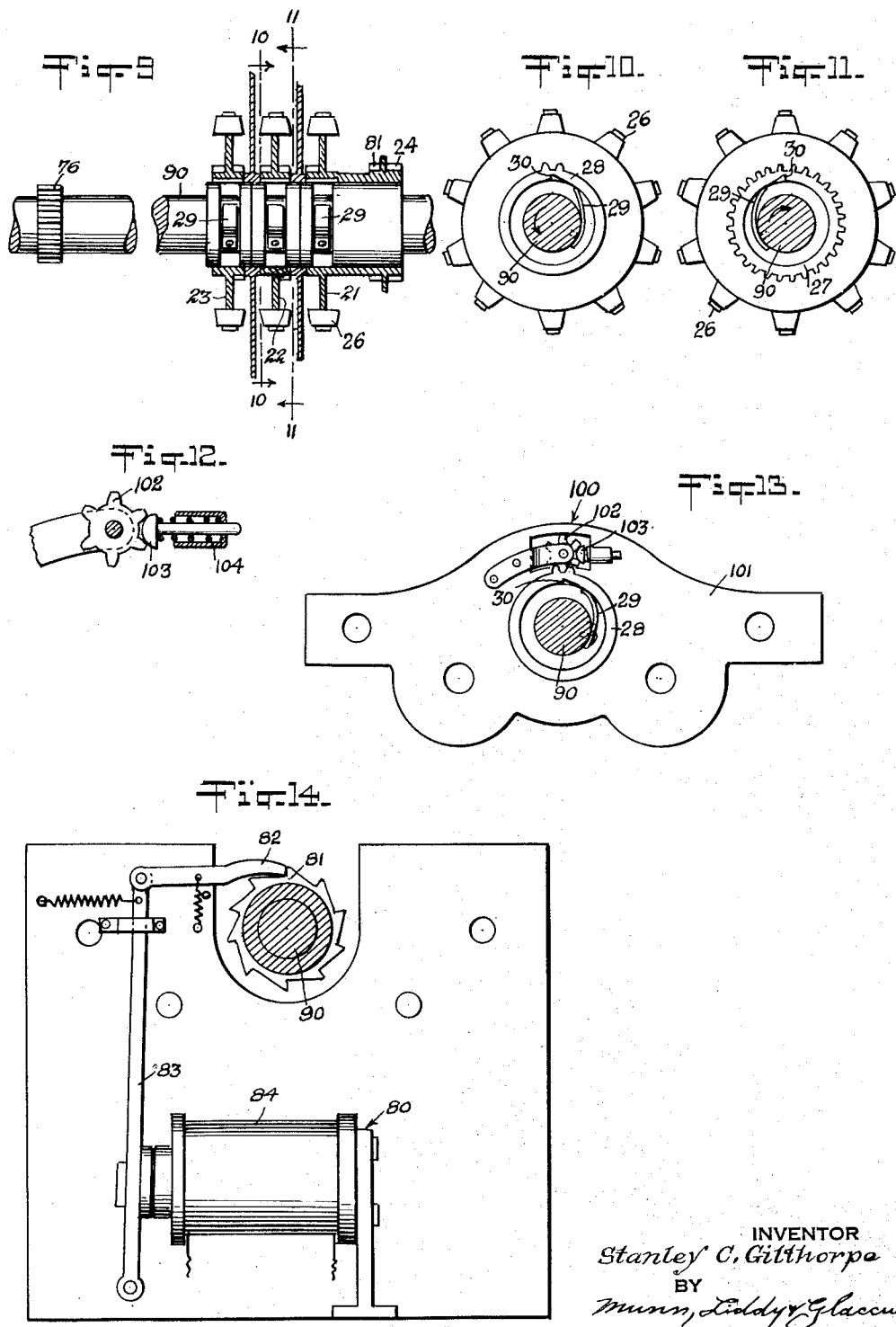

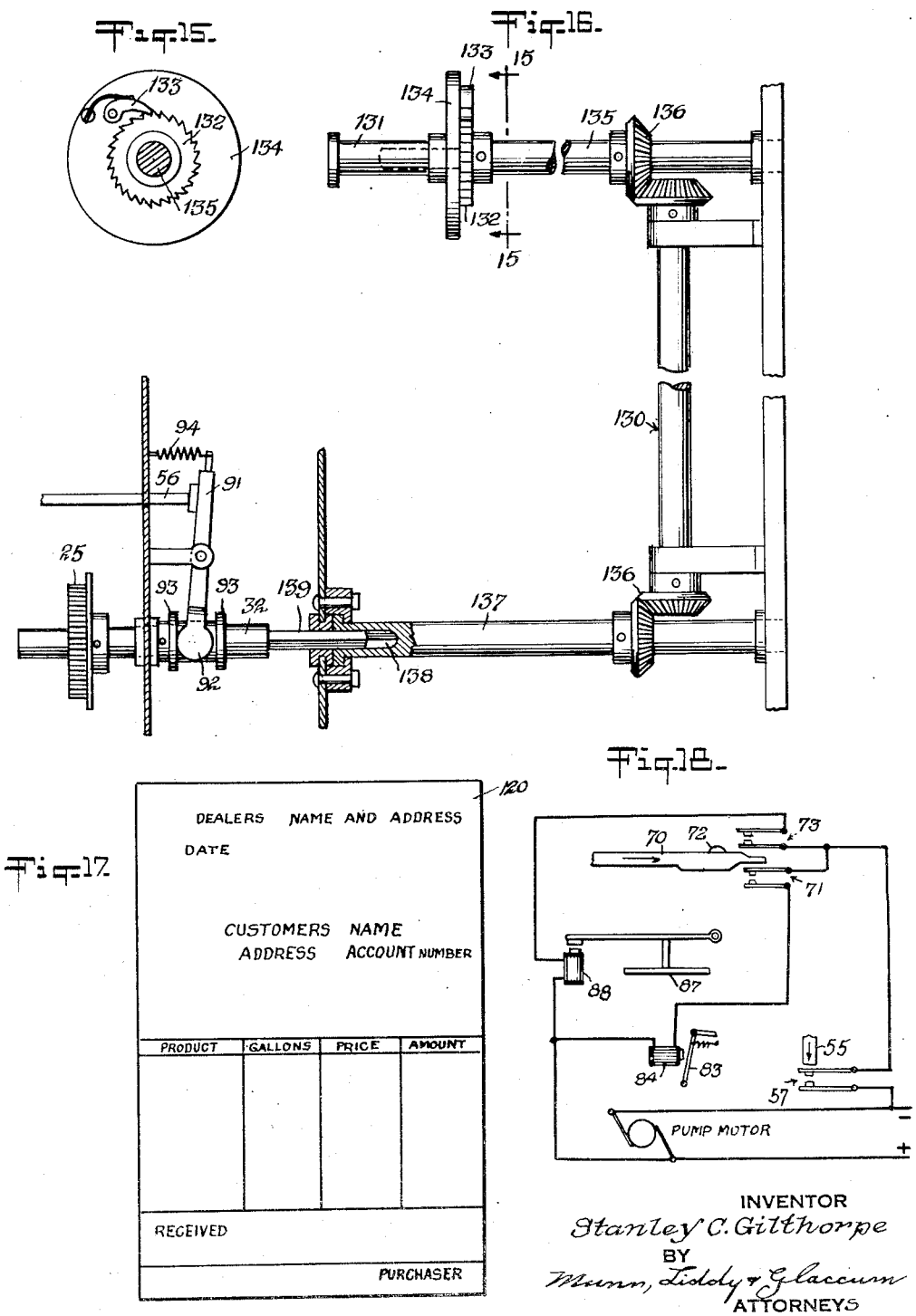

Patented Aug. 26, 1952

2,608,156

UNITED STATES PATENT OFFICE 2,608,156

INVOICE PRINTING MACHINE

Stanley C. Gilthorpe, New Orleans, La.

Application January 24, 1948, Serial No. 4,158

4 Claims. (Cl. 101—287)

My invention relates to fuel dispensing pumps and more specifically to an automatic invoicing device that may be attached to or incorporated in a conventional fuel dispensing pump.

My principal objective was to provide an invoicing device for credit sales which would enable the operator to present the customer with an invoice showing the amount of fuel dispensed and the cost along with other pertinent data.

An advantage would be the simple operation and instantaneous mechanical production of complete invoice at the pump which would furnish an accurate, legible, and permanent record of the quantity of fuel dispensed and the cost from which the customer's monthly statement of purchases may be computed.

My device is particularly adapted to credit sales in which the customer will be furnished with an embossed credit identification plate or printing element containing the customer's name, account number, etc., which may be inserted in the device so that, when the device prints, the customer's name and address in addition to other data will appear the final invoice.

Further advantages of my device are that it will eliminate unnecessary paper work when credit sales are being made and will furnish both the customer and the supplier with an accurate record of the transaction.

Another feature of my invention is that it will in no way interfere with the conventional operation of the gasoline pump, and it will be totally inoperative except under those conditions where a credit sale is being made.

Further advantages and unique features of my invention will be apparent as I proceed with the description.

With reference to the drawings:

Fig. 1 shows a sectional view of my invoicing device on line 1—1 of Fig. 2;

Fig. 2 shows a sectioinal view on line 2—2 of Fig. 1;

Fig. 3 is a plan view of the impression plate on a reduced scale on line 3—3 of Fig. 2;

Fig. 4 is a sectional view on the line 4—4 of Fig. 3;

Fig. 5 shows a perspective view of the housing enclosing my device;

Fig. 6 shows a side view of the control bar;

Fig. 7 shows a sectional side view of the slide plate;

Fig. 8 shows a plan view of the slide plate;

Fig. 9 shows a sectional view through one set of printing wheels;

Fig. 10 shows a sectional view on line 10—10 of Fig. 9;

Fig. 11 shows a sectional view on line 11—11 of Fig. 9;

Fig. 12 shows a side view of the gear for transmitting clockwise movement from one printing wheel to an adjoining printing wheel;

Fig. 13 shows a side elevation of the gearing assembly positioned between the printing wheels;

Fig. 14 shows a side elevation of the magnetic alignment device;

Fig. 15 shows a sectional view on line 15—15 of Fig. 16;

Fig. 16 shows a side elevation illustrating the transmission arrangement connecting the pump to the invoicing device;

Fig. 17 shows a sample sales invoice; and

Fig. 18 shows a schematic wiring diagram of the electrical circuit of the invoicing device.

With reference to Fig. 1, I show some of the principal component parts of my invention which consists of a housing 20 enclosing my device, which housing may be either positioned inside a conventional gasoline pump housing or connected on the outside thereof. Inside the housing 20 are two sets of printing wheels A and B which record the amount of fuel dispensed and the total cost of such fuel. The wheels A and B are mounted on a shaft 90 and are free to rotate on this shaft. I further provide in my device a platen 40 on which the invoice is supported during the printing operation. A slide plate 50, in which provision is made to receive and support a printing element or embossed plate 60, is adapted to function in cooperation with the platen 40. The movement of the slide plate 50 also performs certain operative functions which will be described later. My device is also equipped with a control bar 70 for actuating the printing mechanism and performing other functions at the conclusion of the transaction.

Fig. 2 shows additional component parts which include an impression plate 87 which is positioned above the platen 40 and is actuated by an electrical solenoid 88 to press down on the invoice causing the data on the wheels A and B and printing element 60 to print on the invoice. Also shown is an alignment device 80 for moving the printing wheels to a correct position before the invoice is printed.

Shown in Fig. 1 are two sets of printing wheels A and B to record the gallons of fuel dispensed and the cash amount of the transaction. As the gallon and amount wheels and their associated equipment are identical, the same numbers will be used to designate the respective parts. Sets A and B each consist of three wheels 21, 22 and 23 which record the gallons and the total amount of the purchase. All of the wheels are mounted on shaft 90 and are free to rotate on this shaft. Wheel 21 is attached to a primary gear 24 which is driven by gear 25 that may be selectively connected to the pump mechanism of a conventional fuel dispensing pump.

Positioned between wheels 21 and 22 and wheels 22 and 23 is a gearing mechanism as illustrated in Figs. 9 to 13 inclusive. This gearing arrangement provides for wheel 21 to make a complete revolution before wheel 22 is moved one-tenth. Likewise, wheel 22 makes a complete revolution before wheel 23 is moved one tenth. Figs. 10 and 11 show opposite side views of a wheel which is equipped with raised numbers 26 from 0 to 9 and which have a gear 27 with 20 teeth on one side and a gear 28 with two teeth on the opposite side. Fig. 13 shows a plate 101 which is mounted between adjoining wheels 21 and 22 and 22 and 23 and which supports a connecting gear 102 that meshes with gear 27 and gear 28 of adjoining wheels to transmit a clockwise movement from one printing wheel to the next. It can be seen then that wheel 21 will make one complete revolution before the adjoining wheel 22 will be advanced one tenth or to the next highest numeral through the gear 102. Likewise, wheel 22 will make one complete revolution before wheel 23 will be advanced one tenth or to the next highest numeral through the gear 102. Fig. 12 shows a round headed pin 103 that is held in engagement with the teeth of gear 102 by spring 104. The pin 103 serves to hold the gear 102 rigid and works back and forth as gear 102 revolves.

A provision for resetting the sets of wheels A and B to "0" after a transaction is shown in Figs. 10 and 11. This resetting mechanism consists of flexible springs 29 which are mounted on the shaft 90 and are adapted to engage in notches 30 on the wheels 21, 22 and 23. As the wheels rotate in a clockwise direction to record the amount of the sale, the springs 29 will not engage in the notches 30. However, after the transaction has been completed the shaft 90 is rotated in a counterclockwise direction in a manner to be later described. As this counterclockwise movement takes place the spring 29 will engage in the notches 30 and will reset wheels 21, 22 and 23 to the "0" position. Positioned between the two sets of wheels A and B is a third set of wheels C which may be manually set to indicate the price of the fuel being dispensed. These wheels do not move and must be changed manually. An additional set of printing wheels D is provided which indicates the month, day and year on which the transaction took place. Likewise, these wheels must be manually set to record the desired date. The primary wheel of the gallons has a period before the numerals to indicate tenths while the middle wheel of the amount has a period before the numerals to indicate cents. The housing 20 is also provided with openings 110 and 111 through which the date and price wheels D and C respectively may be manually reset.

A further feature in connection with the primary printing wheel 21 of each set is a provision for advancing these wheels so that the numbers will always be in printing position. Fig. 14 shows a view of this alignment device 80 which is duplicated for each set of wheels A and B and which consists of a ratchet gear 81 attached to the back of gear 24. Positioned in the teeth of the ratchet gear 81 is a pawl 82 which is connected to an arm 83 that is operated by a solenoid 84. At the completion of the transaction if a number on the primary wheel 21 is not perfectly horizontal and, therefore, not in printing position the electrical solenoid 84 is energized which will cause the pawl 82 to engage in the teeth of gear 81 and advance it a short distance which will result in the number on the wheel 21 being accurately positioned for the printing operation. This causes the numbers 26 on the primary wheels 21 to present a flat printing surface eliminating the possibility of the wheels stopping between fractions of gallons or cents. The pawl 82 also holds the printing wheels A and B in position for printing and releases immediately after the solenoid 84 has been deenergized.

Secured in a horizontal position in the housing 20 is a platen 40. The platen 40 is equipped with a countersunk plate 41 on which the dealer's name and address and other data may be placed. In addition, the platen 40 is equipped with openings 42 and 43 for the date wheels D, and the wheels A, C and B indicating the gallons, price of the fuel, and the total cost. Centrally located in the platen 40 is a guideway 44 in which the slide plate 50 is positioned. All of the printing indicia on the wheels A, B, C and D and the plate 41 are flush with each other so that when the invoice 120 is placed face downward on the platen 40 and pressure is applied to the invoice, the data on the wheels and plates will be transferred to the invoice form. The platen 40 may also be equipped with guides to hold the invoice form in position during the printing operation.

Positioned directly above the platen 40 is an impression plate 87 which is actuated by an electrical solenoid 88 when the transaction has been completed. The invoice form 120 which normally consists of one or more sheets of paper with carbons in between is placed through the throat 121 in the housing 20 and face down on the platen 40. The first sheet of the invoice form which is in contact with the various printing indicia is a carbon. When the electrical solenoid 88 is energized, the impression plate 87 is forced down on top of the invoice form 120 pressing the form against the printing indicia resulting in this indicia being transferred to the invoice form. When the electrical solenoid 88 is deenergized, the spring 89 pulls the impression plate 87 upward allowing the invoice 120 to be removed from the device. As illustrated in Figs. 2, 3 and 4 the plate 87 also serves as a retainer for the cushion 140 that presses against the back of the invoice form 120. Attached to the top surface of the plate 87 are two stems 141 that move upwardly and downwardly through the impression head guide 142. The guide 142 is securely fastened to the housing 20. Positioned around the upper ends of the stems are spring 89. The upper end of the spring 89 abuts against a flange 143 that is held in place through a cotter pin 144. The lower end of the springs are supported by the bar 145 which in turn is supported by bolt 146 that is secured to the guide 142. The upper portion of the stems 141 are slotted and positioned in the slots 147 are arms 148. One end of the arms 148 is pivoted at 149 while the other end is attached to a metal plate 150 which operates in conjunction with the solenoid 88. The under part of the arms 148 are equipped with rounded projections 151 that rest in the bottom of the slots 147 that are concave so that a rolling motion will be transmitted to the plate as it is pulled downward. As the solenoid 88 is energized, the metal plate 150 will be attracted resulting in the arms 148 being pulled downward, which causes the stems 141 and the plate 87 to move downward bringing the cushion 140 in contact with the back of the invoice form 120. On this downward movement the springs 89 will be compressed against the bar 145 so that when the solenoid 88 is de-energized the springs 89 will cause the plate 87 to raise off the invoice form 120.

The slide plate 50 which is adapted to slidably operate in the guideway 44 of the platen 40 is equipped with a cut-out portion 51 which is adapted to receive and support the printing element 60 which the customer will supply. The printing element 60 will normally consist of a metal plate having raised or embossed letters 61 containing various indicia as to the name of the customer, his address, charge account number, etc. The printing element 60 is inserted in the opening 51 in the plate 50 and the plate 50 is then pushed inward. The printing element 60 is so constructed that the indicia 61 thereon will be at the same level with the numbers on the printing wheels A, B, C and D and other indicia, such as the countersunk plate 41 in the platen 40. As the plate 50 is pushed inward, it is locked in position through a latch 52 which engages in a notch 53 in the bottom of the plate 50. At the same time the plate holder eject plunger 54 is compressed. The two legs 55 and 56 of the plate 50 perform different functions: leg 55 closes electrical contacts 57 which energize the electrical control circuit of the invoicing device; and leg 56 operatively engages gear 24 that actuate the printing wheels A and B with gears 25 that are connected to the pump mechanism.

Figs. 15 and 16 illustrate the connection between the pump mechanism of the fuel dispensing pump and the invoicing device. The gearing mechanism 130 shown in Fig. 16 is duplicated for shafts 31 and 32 which drive the primary gallon wheels A and amount wheels B respectively. The amount wheels B of the invoicing device would be connected through the mechanism 130 to the primary amount dial shaft 131 of the dispensing pump, and a similar connection would be made between the gallon wheels A and the primary gallon dial of the pump. The shaft 131 leading off the primary amount dial of the pump is coupled to shaft 135. Shaft 135 has a ratchet gear 132, and a pawl 133 engages in the teeth of gear 132. The pawl 133 is affixed to a disc 134 which is attached to the shaft 131 from the pump. When the pump shaft 131 rotates, the disc 134 will rotate causing the pawl 133 to engage in the teeth of the gear 132 thereby driving shaft 135. Shaft 135 is connected through a bevel gear arrangement 136 to shaft 137 which is operatively connected to shaft 32 of the invoicing device. The end of the shaft 137 is equipped with a square hole 138 to allow the complementary end 139 of shaft 32 to slide in and out when engaged or disengaged by the operation of the leg 56 of the plate 50. Secured to the inner end of the shaft 32 is gear 25 that is is adapted to mesh with the primary gear 24 when the shaft 32 is moved inwardly. As the plate 50 is pushed inward the leg 56 contacts the upper end of arm 91 which is pivoted at its mid point. The lower end of the arm is equipped with a U-shaped member 92 that straddles the shaft 32 and is positioned between discs 93 that are secured to the shaft. As the leg 56 pushes the arm 91 it causes the U-shaped member 92 to move inwardly resulting in gear 25 engaging with gear 24. When the plate 50 is removed, the spring 94 will bring the arm back to its normal position causing the shaft 32 to move outwardly resulting in gear 25 being disengaged from gear 24. Through this arrangement the wheels B on the invoicing device will be driven at the same speed as the amount dials on the pump mechanism and any change in speed in the pump mechanism will cause an appropriate change in in the speed at which the wheels on the invoicing device are driven. As stated previously the gearing mechanism 130 is duplicated for the gallons and amount dials which will rotate at different rates of speed. However, as shown in Fig. 2 the arm 91 operates both shafts 31 and 32 through the provision of a bar 95 that connects the U-shaped members 92 and 96, and movement of the arm 91 will cause shafts 31 and 32 to move in or out.

The invoicing device is also provided with a control rod 70 that performs several functions. The rod 70 in its normal position extends outwardly from the housing 20. Upon the completion of the transaction the rod is pushed inwardly and this action completes the printing of the invoice form and on its return stroke resets the wheels to "0" and releases the plate so that the printing element may be returned to the customer. As the rod 70 is pushed inwardly it causes contacts 71 to close which energizes the alignment solenoid 84 causing the printing wheels to assume a correct position for the printing operation. As the control rod 70 continues inwardly, a projection 72 causes contacts 73 to close which energizes the solenoid 88 that operates the impression plate 87.

Likewise, on this inward stroke the projection 74 will raise the latch 52 causing the plate 50 to be released and pushed outwardly by the plunger 54 which had been placed in a compressed position when the plate was pushed inwardly. Due to the arrangement of the contacts 73 that cause the impression solenoid 88 to be operated, these contacts will close before the plate latch is released assuring the plate being securely held during the printing operation. On the return stroke of the control rod 70 which is pulled back through the spring 75, the gear 76 that is secured to shaft 90 engages in the ratchet 77 causing the shaft 90 to be rotated counterclockwise resulting in the springs 29 engaging in the notches 30, and returning the wheels A and B to their "0" position. As previously explained when the control rod 70 is pushed inwardly the clockwise rotation of the gear 76 has no effect on the setting of the wheels, in view of the fact that the springs 29 will not engage in the notches 30. Heads 78 on the extreme inner end of the control bar 70 limit the outward movement of the bar thereby assuring the wheels being returned to "0" position.

In operation the device works as follows: When the customer gives the attendant his printing element or plate 60, the attendant places it in the plate slide 50 and pushes the plate slide into the machine. This results in the printing element being in position to print on the invoice and also locks the plate slide 50 in position until the transaction is completed. Furthermore, leg 55 of the plate closes the electrical circuit and leg 56 causes the driving mechanism of the pump to mesh with the shafts 31 and 32 to which the printing wheels A and B of the invoicing device are connected. An invoice form 120 is then placed face down on the platen 40 through throat 121 of the housing 20 in such a manner that the carbon is contacting the printing indicia on the wheels A, B, C and D, printing element 60 and plate 41. After pumping the desired amount of fuel which will register as to amount and price on the dials A and B of the invoicing machine, the attendant hangs up his hose as usual. He then pushes the control bar 70 inwardly which causes the alignment magnetic coil 84 to energize and the stamp impression solenoid 88 to energize. Also, the plate slide 50 will be unlocked and ejected by the compression plunger 54. As the plate slide 50 moves outwardly the main control circuit contacts 57 will be opened and the gearing mechanism of the invoicing device will become disengaged from the pumping mechanism of the fuel pump. The outward movement of the control bar 70 will also open the contacts 71 of the alignment magnetic solenoid 84 and will rerest all the printing wheels A and B to "0". The attendant may then take the completed printing sales invoice 120 from the device and present it to the customer for signature and at the same time return to the customer his plate or printing element 60.

Fig. 17 shows a typical invoice form 120 on which the data concerning the dealer's name and address will be transferred from plate 41. The date will be transferred to the form 120 from wheels D while the data concerning the customer as to name, address, charge account number, etc. will be transferred from the printing element 60. An additional plate may be countersunk in the platen 40 to indicate the name of the product while the gallons, price and amount will be printed on the invoice form from wheels A, C and B respectively. Fig. 18 shows a schematic wiring diagram of the electrical circuit of the invoicing device.

While the invention has been described in detail with respect to the present preferred form which it may assume, it is not to be limited to such details and form since many changes and modifications may be made in the invention without departing from the spirit and scope of the invention in its broadest aspects. Hence, it is designed to cover any and all forms and modifications of the invention which may come within the language or scope of any one or more of the appended claims.

I claim:

1. A sales invoice printing machine including the combination of a slide plate having guided movement between a protracted position and a retracted position, said plate having an opening therein to be occupied by a printing element brought into a printing position by the plate when moved into its protracted position, an impression member movable up and down with respect to the printing element in its printing position, releasable means to retain the plate in its protracted position, means to operate the impression member, manually operable means to operate the last mentioned means and said releasable means, so as to operate the impression member and then release the plate for movement into its retracted position, and means to move the plate into its retracted position when released.

2. A sales invoice printing machine as set forth in claim 1, wherein said means to operate the impression member comprises an electric circuit having a solenoid and a circuit closer; levers, rods rigidly rising from the impression member which cooperate with the levers respectively, a fixed bar, springs interposed between the bar and means on the rods to move the impression member to a non-printing position, and said manually operable means when actuated causing the operation of the circuit closer and subsequently causing the operation of the releasable means for the stated purposes.

3. A sales invoice printing machine as set forth in claim 1, wherein said means to operate the impression member is electro-mechanical and includes a circuit closer which is closed by the manually operable means.

4. A sales invoice printing machine as set forth in claim 1, and control means operated by the movement of the platen into the protracted position rendering the impression plate operating means operable, and said control means being operated by the movement of the platen into the retracted position rendering said impression plate operating means inoperable.

STANLEY C. GILTHORPE.

REFERENCES CITED

The following references are of record in the file of this patent:

UNITED STATES PATENTS

| Number | Name | Date |
|---|---|---|
| Re. 12,761 | Hawley | Mar. 10, 1908 |
| 309,537 | Gillette | Dec. 23, 1884 |
| 1,427,115 | Milligan | Aug. 29, 1922 |
| 1,524,620 | Hatmaker | Jan. 27, 1925 |
| 1,875,119 | Ohmer et al. | Aug. 30, 1932 |
| 2,087,315 | Bugg et al. | July 20, 1937 |
| 2,092,026 | Schaefer | Sept. 7, 1937 |
| 2,132,412 | Gollwitzer | Oct. 11, 1938 |
| 2,214,796 | Ostler | Sept. 17, 1940 |
| 2,250,326 | Carroll | July 22, 1941 |
| 2,276,111 | Spears | Mar. 10, 1942 |
| 2,327,584 | Goldberg et al. | Aug. 24, 1943 |
| 2,354,249 | Eickmeyer et al. | July 25, 1944 |
| 2,410,935 | Gollwitzer | Nov. 12, 1946 |